US011027705B2

(12) United States Patent
Lopez et al.

(10) Patent No.: US 11,027,705 B2
(45) Date of Patent: Jun. 8, 2021

(54) WINDSCREEN WIPER DEVICE

(71) Applicant: Federal-Mogul Motorparts LLC, Southfield, MI (US)

(72) Inventors: David Reyes Lopez, Chihuahua (MX); Miguel Angel Gallegos, Cd. Juarez (MX); Esteban Figueroa Ortiz, Cd. Juarez (MX); Miguel Gutierrez, Cd. Juarez (MX); Jesus Yee, El Paso, TX (US)

(73) Assignee: Trico Products Corporation, Rochester Hills, MI (US)

( * ) Notice: Subject to any disclaimer, the term of this patent is extended or adjusted under 35 U.S.C. 154(b) by 299 days.

(21) Appl. No.: 16/179,089

(22) Filed: Nov. 2, 2018

(65) Prior Publication Data

US 2019/0135237 A1 May 9, 2019

Related U.S. Application Data

(60) Provisional application No. 62/581,432, filed on Nov. 3, 2017.

(51) Int. Cl.
*B60S 1/40* (2006.01)
*B60S 1/38* (2006.01)

(52) U.S. Cl.
CPC .......... *B60S 1/4048* (2013.01); *B60S 1/4003* (2013.01); *B60S 1/3868* (2013.01); *B60S 2001/4051* (2013.01); *B60S 2001/4054* (2013.01)

(58) Field of Classification Search
CPC .... B60S 1/4038; B60S 1/4045; B60S 1/4048; B60S 2001/4051; B60S 2001/4054;
(Continued)

(56) References Cited

U.S. PATENT DOCUMENTS

2015/0013093 A1 1/2015 Polocoser et al.
2016/0264101 A1* 9/2016 Ohta ................. B60S 1/4048
(Continued)

FOREIGN PATENT DOCUMENTS

| EP | 3112223 A1 | 1/2017 |
| EP | 3118070 A1 | 1/2017 |
| WO | 2013/030130 | * 3/2013 |

OTHER PUBLICATIONS

International Search Report, dated Feb. 13, 2019 (PCT/US2018/059104).

*Primary Examiner* — Gary K. Graham
(74) *Attorney, Agent, or Firm* — Miller Canfield (57) ABSTRACT

The windscreen wiper device includes a wiper element and a least one carrier element. The wiper device also includes a connecting device, which includes a base and a joint part. The joint part has a top wall that extends in a lateral direction between a pair of side walls. The joint part also has a button configuration for lockingly attaching the connecting device with at least two different types of oscillating wiper arms. The button configuration includes first and second buttons, each of which is attached with the side walls via resilient strips. The resilient strips extend directly from the side walls to the buttons. The resilient strips bias the buttons into raised positions wherein the buttons project above the top walls. The resilient strips also allow the buttons to move to a pressed position wherein a top surface of the respective button is generally flush with the top wall.

12 Claims, 5 Drawing Sheets

(58) Field of Classification Search
CPC .... B60S 1/40; B60S 2001/409; B60S 1/4003; B60S 1/3868
USPC ...................................................... 15/250.32
See application file for complete search history.

(56) References Cited

U.S. PATENT DOCUMENTS

| | | |
|---|---|---|
| 2016/0375869 A1 | 12/2016 | Gaucher et al. |
| 2017/0015281 A1 | 1/2017 | Mouleyre et al. |
| 2018/0086312 A1* | 3/2018 | Houssat ................ B60S 1/4006 |

* cited by examiner

WINDSCREEN WIPER DEVICE

CROSS REFERENCE TO RELATED APPLICATIONS

This U.S. Patent Application claims the benefit of U.S. Provisional Patent Application Ser. No. 62/581,432 filed Nov. 3, 2017 entitled "Windscreen Wiper Device," the entire disclosure of the application being considered part of the disclosure of this application and hereby incorporated by reference.

BACKGROUND OF THE INVENTION

1. Field of the Invention

The present invention is related generally to windscreen wiper devices and, more particularly, to a connector device for a windscreen wiper device.

2. Related Art

Vehicles are assembled with a permanent oscillating arm, which is designed to last for the life of the vehicle, and a windscreen wiper device that is designed to be detached from the oscillating arm and replaced when worn. Since the oscillating arm is permanent, when a customer needs to replace their windshield wiper device with an aftermarket device, they must select one that is designed to accommodate their oscillating arm. Thus, aftermarket windscreen wiper devices must supply windscreen wiper devices that are capable of attachment with these various different types of oscillating arms. Thus, there is a continuing desire for windscreen wiper device connectors that are designed to accommodate, in a reliable and secure manner, multiple different types of oscillating arms. It is further a desire that such connectors be both easy and intuitive for a customer to attach with and detach from the oscillating arm.

SUMMARY OF THE INVENTION AND ADVANTAGES

One aspect of the present invention is related to a windscreen wiper device which includes a wiper element that is made out of an elastomeric material and a least one carrier element that operably supports the wiper element. The wiper device also includes a connecting device, which includes a base and a joint part. The base is fixedly attached with the at least one carrier element, and the joint part is attached with the base such that the joint part can pivot about a pivot axis. The joint part has a top wall that extends in a lateral direction between a pair of side walls. The joint part also has a button configuration for lockingly attaching the connecting device with at least two different types of oscillating wiper arms. The button configuration includes a first button and a second button. Each of the buttons is attached with the side walls via resilient strips. Each resilient strip extends directly from one of the side walls to one of the first and second buttons. The resilient strips bias the first and second buttons into raised positions wherein the buttons project above the top walls. The resilient strips also allow the first and second buttons to move to a pressed position wherein a top surface of the first or second button is generally flush with the top wall.

The joint part advantageously is able to attach with and detach from at least two different types of bayonet-style oscillating arms in a very simple and intuitive manner. That is, connecting either type of bayonet-style oscillating arm with the joint part involves simply sliding the oscillating arm onto the joint part until either the first button or the second button snaps into a respective opening. Detachment involves simply pressing the respective button downwardly and sliding the oscillating arm off of the joint part. The joint part may also be made as a monolithic piece of injection molded plastic, which offers substantial cost savings as compared to other known joint parts which require multiple pieces to attach with different styles of oscillating wiper arms.

According to another aspect of the present invention, two resilient strips are connected with the first button, and two resilient strips are connected with the second button.

According to yet another aspect of the present invention, each of the resilient strips is generally L-shaped with a short leg that is directly connected with one of the side walls and a long leg that is directly connected with one of the first and second buttons.

According to still another aspect of the present invention, for each of the resilient strips, the short leg is directly connected with a respective one of the side walls at a location which is spaced vertically below the top wall.

According to a further aspect of the present invention, the first and second buttons are spaced from one another in a longitudinal direction.

According to still another aspect of the present invention, each of the first and second buttons has a ramped surface which faces in a longitudinal direction away from the pivot axis.

According to a further aspect of the present invention, in the longitudinal direction, the second button is located between the first button and the pivot axis.

According to yet a further aspect of the present invention, the top wall of the joint part has a window, and the first and second buttons are located in the window.

According to still a further aspect of the present invention, the joint part includes a main body portion and a front nose portion that is positioned at one longitudinal end of the main body portion.

According to another aspect of the present invention, the front nose portion has a tongue which overlies the top wall.

According to yet another aspect of the present invention, the front nose portion has a greater width and a greater height than the main body portion.

According to still another aspect of the present invention, the joint part includes spring fingers that protrude laterally outwardly from the side walls.

According to a further aspect of the present invention, the base includes a pair of laterally outwardly extending and co-axially aligned protrusions, and the side walls of the joint part include a pair of circular openings that receive the protrusions to connect the joint part with the base.

According to yet a further aspect of the present invention, the first and second buttons are located in a longitudinal direction closer to one longitudinal end of the joint part than to the circular openings.

BRIEF DESCRIPTION OF THE DRAWINGS

These and other features and advantages of the invention will become more readily appreciated when considered in connection with the following description of the presently preferred embodiments, appended claims and accompanying drawings, in which:

DESCRIPTION OF THE ENABLING EMBODIMENT

Figure 1:
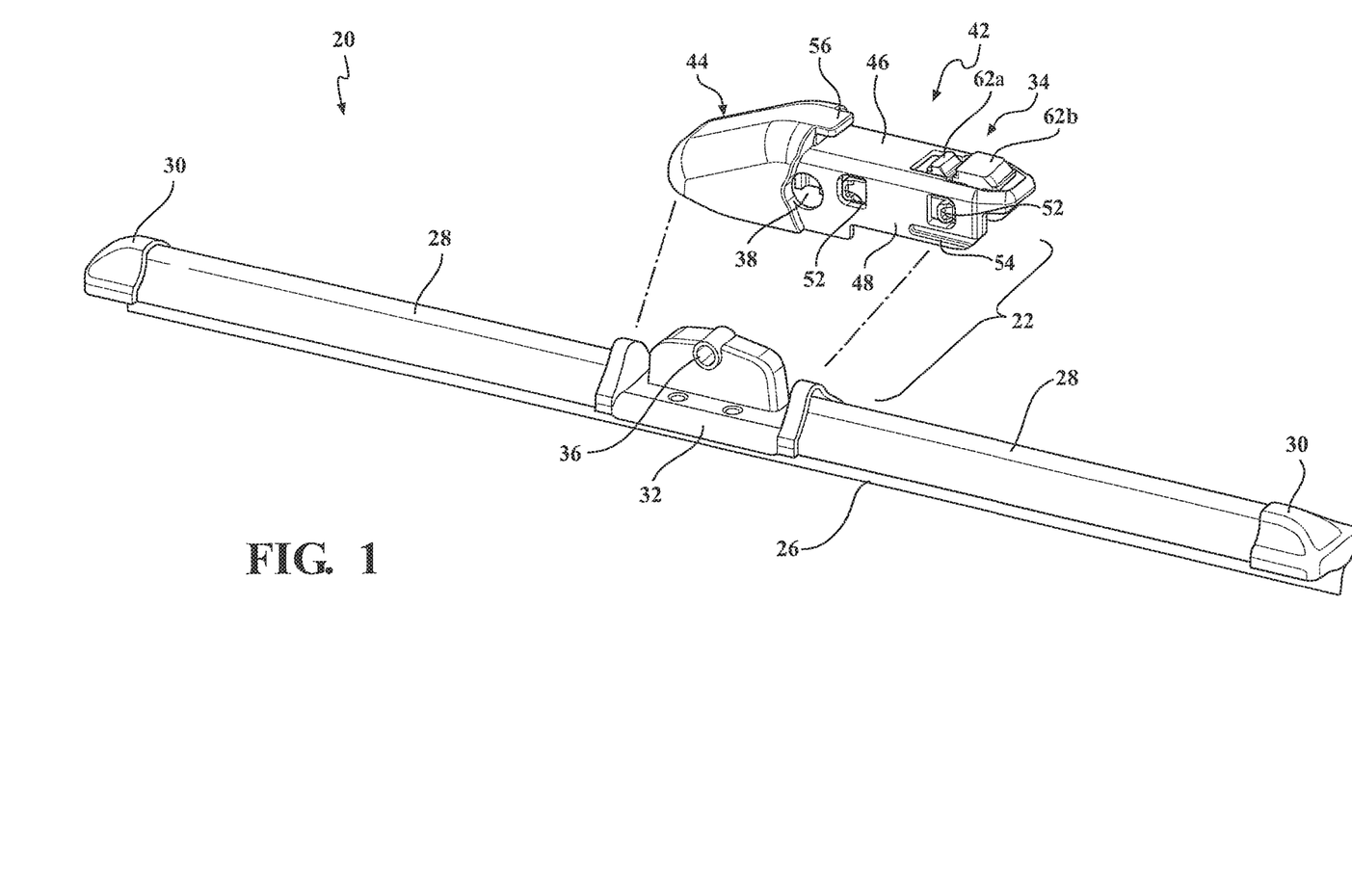
FIG. 1 is a perspective view of a windscreen wiper device a joint part, which is constructed according to one aspect of the present invention, being removed from a base of a connecting device.

Referring to the Figures, wherein like numerals indicate corresponding parts throughout the several views, a windscreen wiper device 20 with an improved connecting device 22 is generally shown in FIG. 1. The improved connecting device 22 is capable of attachment with 17 mm and 19 mm sized bayonet-style oscillating wiper arms 24a, 24b (hereinafter referred to as 17 and 19 mm wiper arms and shown in FIGS. 5 and 8 respectively) without any adapters or extra pieces. The fact that the connecting device 22 can securely and safely attach with each of these wiper arms 24a, 24b allows for manufacturing cost savings through economies of scale and also reduces packaging and stocking costs by reducing the number of different products that a windscreen device manufacturer has to package, offer for sale, and sell.

The windscreen wiper device 20 of the exemplary embodiment has a beam-style construction in that it includes a longitudinally extending carrier element (not shown) which is pre-shaped to bias an elastomeric wiper blade 26 (also known as a wiper strip or a wiping element) into a curved shape. This allows an entire length of the wiper blade 26 to seal against a curved windshield (not shown) of a vehicle as the wiper device 20 oscillates back and forth. That is, in the exemplary windscreen wiper device 20, the carrier element, rather than a series of yokes, distributes a force from the wiper arm 24a, 24b along the length of the wiper blade 26. The windscreen wiper device 20 also includes a pair of sub-spoilers 28, which are may be either made as separate pieces from one another and from the wiper blade 26 or may be made as one monolithic piece with the wiper blade 26. The sub-spoilers 28 are attached with the carrier element and impart a downforce on the wiper blade 26 when the vehicle is travelling at speed to improve the seal between the wiper blade 26 and the windshield. The connecting device 22 is attached with the carrier element and/or the wiper blade 26 at approximately a longitudinal midpoint of the windscreen wiper device 20. A pair of end caps 30 are engaged with opposite ends of the carrier element for retaining the sub-spoilers 28 on the carrier element between the connecting device 22 and the end caps 30. It should be appreciated that the carrier element could include one or more longitudinal strips that are received in one or more longitudinally extending grooves of the wiper blade 26. The one or more grooves could either open laterally outwardly or can be fully enclosed within the wiper blade 26.

The connecting device 22 is of two pieces including a base 32 and a joint part 34. The base is fixedly attached with the carrier element and/or with the wiper blade in a permanent manner. The joint part 34 is pivotably connected with the base 32 by receiving co-axially aligned and circular-shaped protrusions 36 on the base 32 into circular openings 38 in the joint part 34 to allow the joint part 34 to pivot or articulate relative to the base 32 about a pivot axis when attaching the joint part 34 with or detaching the joint part 34 from either of the 17 and 19 mm wiper arms 24a, 24b. The base 32 can be fixedly attached with the carrier element and/or the wiper blade 26 through any suitable means including, for example, ultrasonic welding; heat staking; one or more fasteners; material deformation; etc. The base 32 is preferably made of a single, monolithic piece of metal or plastic and may be shaped through any suitable operation.

Figure 5:
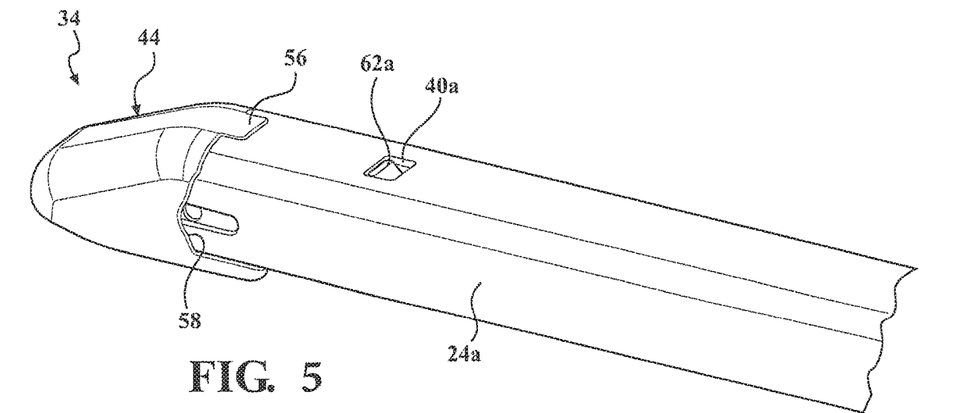
FIG. 5 is a perspective view showing the joint part connected with a 17 mm bayonet style wiper arm.
Figure 6:
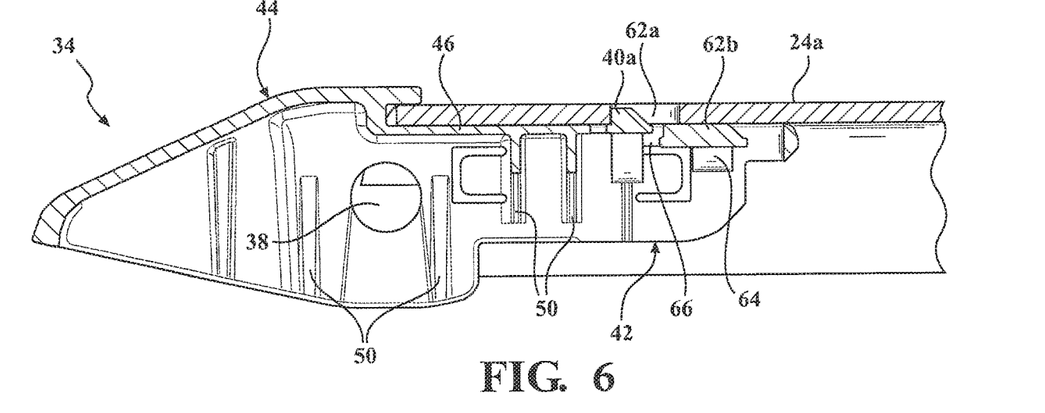
FIG. 6 is a cross-sectional view of FIG. 5.
Figure 7:
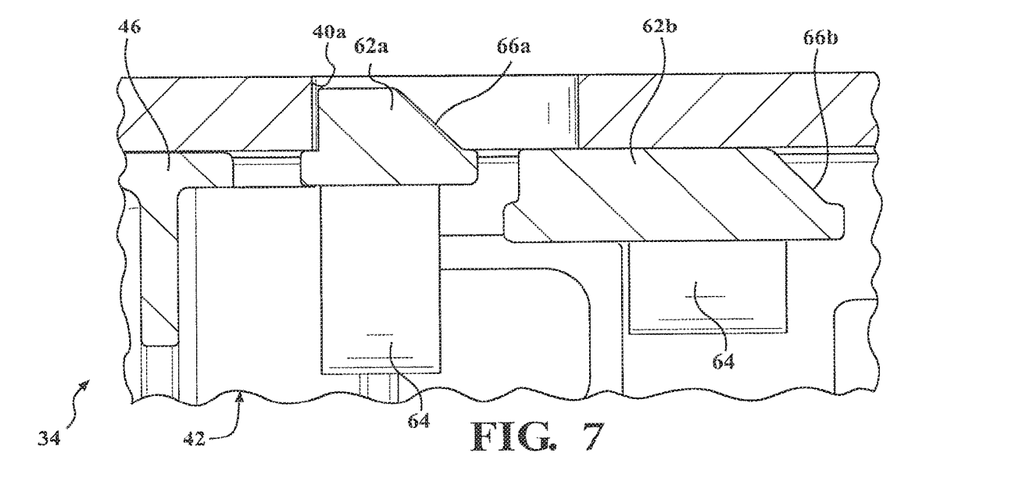
FIG. 7 is an enlarged view of a portion of FIG. 6.
Figure 8:
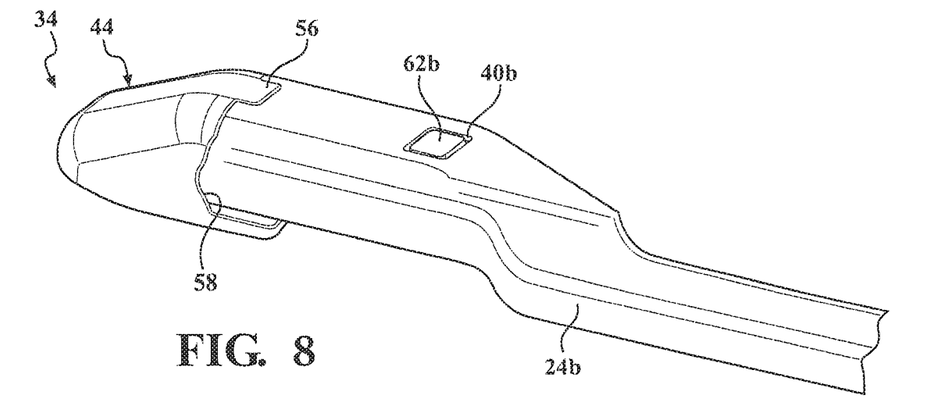
FIG. 8 is a perspective view showing the joint part connected with a 19 mm bayonet style wiper arm.
Figure 9:
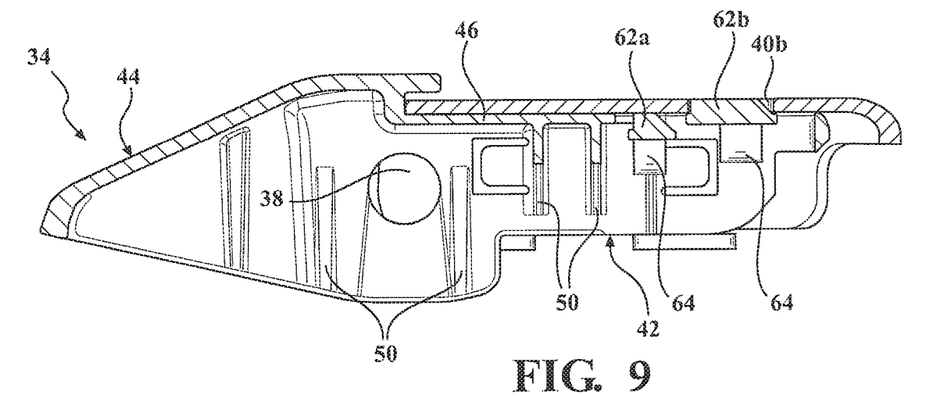
FIG. 9 is a cross-sectional view of FIG. 8.
Figure 10:
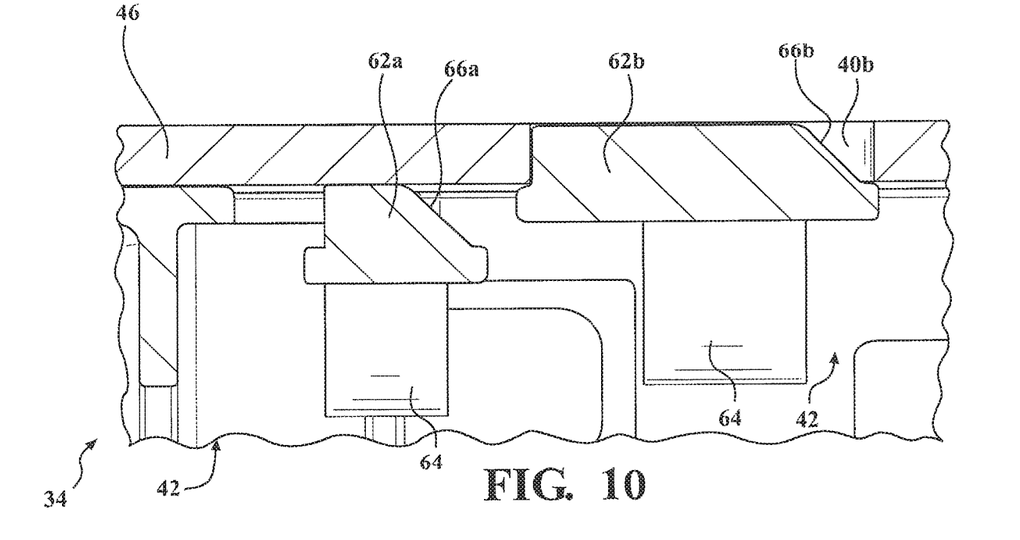
FIG. 10 is an enlarged view of a portion of FIG. 9.

The joint part 34 of the exemplary embodiment is made as a single, integral piece of injection molded plastic and is configured to directly attached with both of the 17 mm and 19 mm wiper arms 24a, 24b such that the windscreen wiper device 20 with this joint part 34 can be packaged and sold to customers whose cars have either of these wiper arms 24a, 24b. FIGS. 5-7 show the joint part 34 in connection with the 17 mm wiper arm 24a, and FIGS. 8-10 show the joint part 34 in connection with the 19 mm wiper arm 24b. As shown in these Figures, the 17 and 19 mm wiper arms 24a, 24b each are generally U-shaped, as viewed in cross-section, and have tops with rectangular apertures 40a, 40b formed therein. However, these wiper arms 24a, 24b have different features from one another and are not merely the same geometrical shape constructed to different scales.

The exemplary embodiment of the joint part 34 includes a main body portion 42 that extends in a longitudinal direction between opposite ends and a front nose portion 44 that is joined with one of the longitudinal ends. The main body portion 42 is generally U-shaped as viewed cross-section with a top wall 46 and a pair of side walls 48. The side walls 48 extend vertically downwardly from the top wall 46 and are spaced from one another in a lateral direction by an open space which opens downwardly. As shown in FIGS. 6 and 9, the main body portion 42 has a plurality of stiffening ribs 50 that are formed on the inner surfaces of the top wall 46 and the side walls 48 for strengthening the main body portion 42. The circular openings 38 of the joint part 34 are positioned on the side walls 48 of the main body portion 42 for receiving the protrusions 36 on the base 32 (shown in FIG. 1) to pivotally connect the joint part 34 with the base 32. In the longitudinal direction, the circular openings 38 are located adjacent the front nose portion 44.

Each of the side walls 48 of the main body portion 42 also includes a pair of spring fingers 52 that are spaced from one another and which protrude laterally outwardly from the side walls 48. When the joint part 34 is attached with either one of the 17 mm and 19 mm wiper arms 24a, 24b, the spring fingers 52 resiliently contact inner surfaces of the respective wiper arm 24a, 24b to prevent, or at least reduce, rattling between the joint part 34 and the wiper arm 24a, 24b. In the exemplary embodiment, the spring fingers 52 are located longitudinally between the circular openings 38 and a back longitudinal end of the main body portion 42, and on each side wall, one spring finger 52 is positioned closer to the respective circular opening 38 than to the longitudinal back end and the other spring finger 52 is positioned closer to the longitudinal back end than to the respective circular opening 38. Each of the side walls 48 also has a groove 54 which extends from a rear edge of the main body portion 42 forwardly past one of the spring fingers 52 for receiving a laterally extending protrusion (not shown) in the 17 mm wiper arm 24a. In a vertical direction, the grooves 54 are located between the spring fingers 52 and a lower edge of the main body portion 42.

Figure 2:
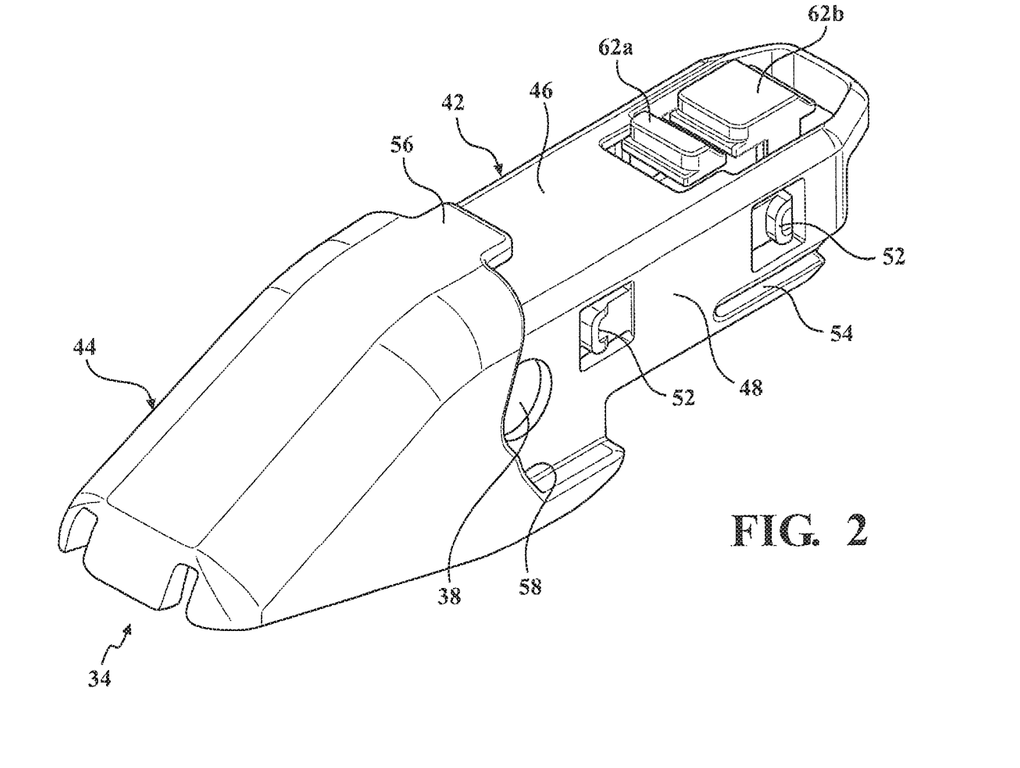
FIG. 2 is a perspective view of the joint part of FIG. 1.
Figure 3:
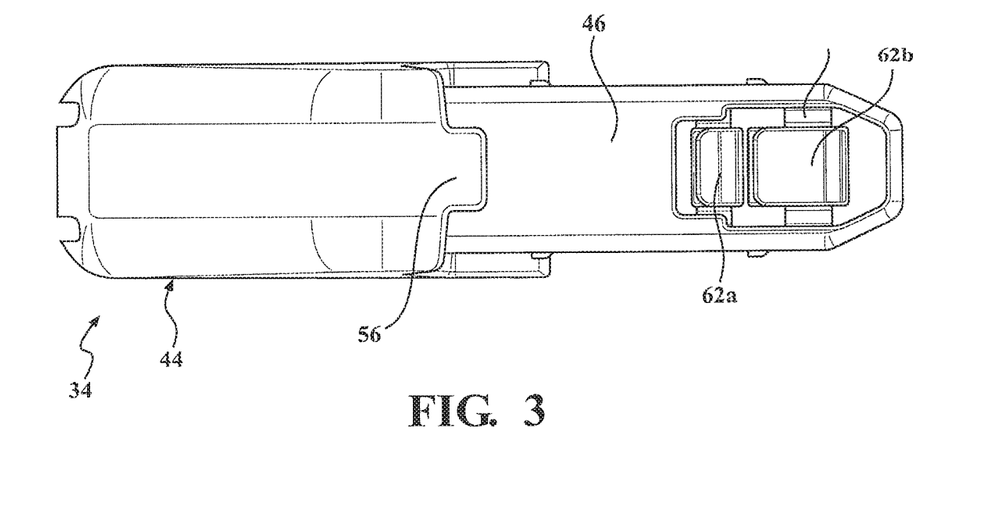
FIG. 3 is a top elevation view of the joint part of FIG. 2.

The front nose portion 44 has a greater width and a greater height than the main body portion 42. The front nose portion 44 has a tongue 56 which overlies and is spaced above the top wall 46 of the main body portion 42 for lockingly engaging a front top edge on each of the 17 and 19 mm wiper arms 24a, 24b, as shown in FIGS. 5 and 8. The front nose portion 44 also has a stop surface 58 which faces and surrounds the main body portion 42. As also shown in FIGS. 5 and 8, when the 17 and 19 mm wiper arms 24a, 24b are attached with the joint part 34, the front edge of the respective wiper arm 24a, 24b abut the stop surface 58 on the front nose portion 44. As shown in FIG. 2, the stop surface 58 is curved such that the circular openings 38 in the side walls 48 overlap, in the longitudinal direction, with parts of the stop surface 58 in the longitudinal direction.

The front nose portion 44 has a top surface which is planar adjacent the tongue 56 and then ramps downwardly towards a front longitudinal end of the joint part 34 such that, as viewed from the side, the front nose portion 44 is generally triangular in shape. The front nose portion 44 also has a bottom flange 60 which underlies a part of the main body portion 42 of the joint part 34. As shown in FIG. 5, when the 17 mm wiper arm 24a is attached with the joint part 34, a lower edge of the wiper arm 24a rests on top of the bottom flange 60. As shown in FIG. 2, the bottom flange 60 extends longitudinally past the circular openings 38 in the main body portion 42.

Figure 4:
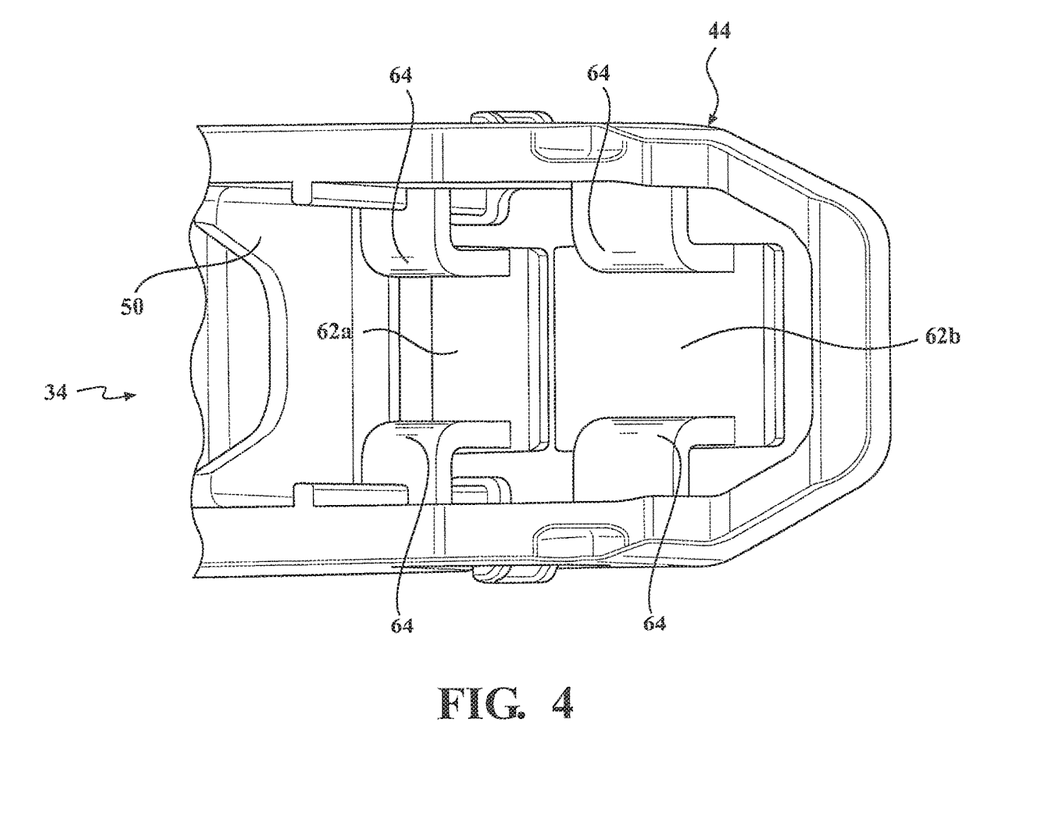
FIG. 4 is a bottom and fragmentary view of a portion of the joint part of FIG. 2.

Referring now to FIG. 4, the main body portion 42 of the joint part 34 has a dual button configuration that is disposed in a window of the top wall 46. The dual button configuration includes first and second buttons 62a, 62b which are spaced longitudinally from one another. As shown in FIG. 7, the first button 62a is shaped and positioned to lockingly engage with the aperture 40a in the top of the 17 mm wiper arm 24a when the first button 62a is in a raised position. As shown in FIG. 10, the second button 62b is shaped and positioned to lockingly engage with the aperture 40b in the top of the 19 mm wiper arm 24b when the second button 62b is in a raised position. As shown in FIG. 2, in the longitudinal direction, the first and second buttons 62a, 62b are both entirely located closer to the back longitudinal end of the main body portion 42 than to the circular openings 38 of the side walls 42.

Each of the first and second buttons 62a, 62b is connected both of the side walls 48 of the main body portion 42 via a pair of resilient strips 64 which bias the buttons 62a, 62b in the respective raised positions. As discussed in further detail below, the resilient strips 64 are configured to deform elastically to allow the first and second buttons 62a, 62b to move vertically from the raised positions to pressed positions wherein the first and second buttons 62a, 62b are generally flush with the top wall 46 of the main body portion 42.

Each of the resilient strips 64 extends from a first end that is connected with a lower surface of the respective button 62a, 62b to a second end that is connected with the respective side wall 48. The second end of each resilient strip 64 is spaced vertically below the top wall 46 of the main body portion 42. When the resilient strips 64 are in their respective resting conditions, they extend through the window such that, in a resting condition, both of the first and second buttons 62a, 62b are entirely located vertically above an upper surface of the top wall 46. That is, when the first and second buttons 62a, 62b are in their respective raised positions, they project above the top wall 46. Each of the resilient strips 64 is generally L-shaped with a short leg that extends in the lateral direction to the second end and a long leg that extends in the vertical direction to the first end. The short and long legs are connected with one another via a curved portion. When the respective one of the first and second buttons 62a, 62b is pressed into the pressed position, the resilient strips 64 deform elastically until they are generally J-shaped.

As shown in FIG. 2, each of the first and second buttons 62a, 62b has a longitudinally rearward facing ramp surface 66a, 66b that is angled upwardly. When the joint part 34 is attached with either of the 17 and 19 mm wiper arms 24a, 24b, a top front edge of the respective wiper arm 24a, 24b first contacts the ramped surface 66b of the second button 62b. This causes the two resilient strips 64 that support the second button 62b to automatically deflect resiliently (i.e., elastically or in a spring-like manner) such that the second button 62b is urged downwardly into the pressed position to allow the front edge of the wiper arm 24a, 24b to pass the second button 62b. The resilient strips 64 that support the first button 62a similarly resiliently deflect to allow the front edge of the 17 or 19 mm wiper arm 24a, 24b to pass the first button 62a. Once the front edge of the respective wiper arm 24a, 24b encounters the stop surface 58 of the front nose portion 44, the respective one of the first and second buttons 62a, 62b snaps up into its resting position, which is now in the aperture 40a, 40b in the top of the wiper arm 24a, 24b, thereby locking the joint part 34 with the wiper arm 24a, 24b.

Either of the 17 and 19 mm wiper arms 24a, 24b can be detached from the joint part 34 by pressing the one of the buttons 62a, 62b in the aperture 40a, 40b of the respective wiper arm 24a, 24b. Pressing the button 62a, 62b resiliently deflects the respective resilient strips 64 to move the button 62a, 62b to the pressed position and thereby disengage it from the wiper arm 24a, 24b. The joint part 34 may then be slid out of the wiper arm 24a, 24b.

From a user perspective, the processes of attaching and detaching either of the 17 and 19 mm wiper arms 24a, 24b are basically equivalent and are very simple. To attach the joint part 34, the user simply slides the joint part 34 onto his or her wiper arm 24a, 24b until he or she hears one of the buttons 62a, 62b snap into the opening 40a, 40b of his or her wiper arm 24a, 24b. To detach the joint part 34, the user simply presses the only visible button 62a, 62b and slides the joint part 34 out of his or her wiper arm 24a, 24b.

Obviously, many modifications and variations of the present invention are possible in light of the above teachings and may be practiced otherwise than as specifically described while within the scope of the appended claims. Additionally, it is to be understood that all features of all claims and all embodiments can be combined with each other, as long as they do not contradict each other.

What is claimed is:

1. A windscreen wiper device, comprising:
a wiper element made of an elastomeric material;
at least one carrier element operably supporting said wiper element;
a connecting device including a base that is fixedly attached with said at least one carrier element and including a joint part that is attached with said base such that said joint part can pivot about a pivot axis;
said joint part having a top wall that extends in a lateral direction between a pair of side walls;

said joint part including a button configuration for lockingly attaching said connecting device with at least two different types of oscillating wiper arms;

said button configuration including a first button and a second button; and each of said first and second buttons being attached with said side walls via resilient strips, each resilient strip extending directly from one of said side walls at a location which is spaced vertically below said top wall to one of said first and second buttons, said resilient strips biasing said first and second buttons into raised positions wherein said first and second buttons project above said top wall, and said resilient strips allowing said first and second buttons to move to a pressed button position wherein a top surface of said first or second button is generally flush with said top wall.

2. The windscreen wiper device as set forth in claim 1 further including two resilient strips which are connected with said first button and two resilient strips which are connected with said second button.

3. The windscreen wiper device as set forth in claim 1 wherein each of said resilient strips is generally L-shaped with a short leg that is directly connected with one of said side walls and a long leg that is directly connected with one of said first and second buttons.

4. The windscreen wiper device as set forth in claim 1 wherein said first and second buttons are spaced from one another in a longitudinal direction.

5. The windscreen wiper device as set forth in claim 1 wherein each of said first and second buttons has a ramped surface which faces in a longitudinal direction away from said pivot axis.

6. The windscreen wiper device as set forth in claim 1 wherein said top wall of said joint part has a window and wherein said first and second buttons are located in said window.

7. The windscreen wiper device as set forth in claim 1 wherein said joint part includes a main body portion and a front nose portion that is positioned at one longitudinal end of said main body portion.

8. The windscreen wiper device as set forth in claim 7 wherein said front nose portion has a tongue which overlies said top wall.

9. The windscreen wiper device as set forth in claim 7 wherein said front nose portion has a greater width and a greater height than said main body portion.

10. The windscreen wiper device as set forth in claim 1 wherein said joint part includes spring fingers that protrude laterally outwardly from said side walls.

11. The windscreen wiper device as set forth in claim 1 wherein said base includes a pair of laterally outwardly extending and co-axially aligned protrusions and wherein said side walls of said joint part include a pair of circular openings which receive said protrusions to connect said joint part with said base.

12. The windscreen wiper device as set forth in claim 11 wherein said first and second buttons are located in a longitudinal direction closer to one longitudinal end of said joint part than to said circular openings.

* * * * *